United States Patent [19]

Beall, Jr.

[11] Patent Number: 5,662,793
[45] Date of Patent: Sep. 2, 1997

[54] VALVE ASSEMBLY OF A REVERSE OSMOSIS WATER PURIFICATION SYSTEM

[76] Inventor: Richard W. Beall, Jr., 229 4th Pl., Manhattan Beach, Calif. 90266

[21] Appl. No.: 583,405

[22] Filed: Jan. 5, 1996

[51] Int. Cl.⁶ .................. B01D 21/30; B01D 63/00
[52] U.S. Cl. .............. 210/134; 210/257.2; 210/195.2; 210/136; 210/90; 210/433.1
[58] Field of Search .................. 210/257.2, 136, 210/195.2, 134, 90, 321.6, 433.1, 652; 137/82; 417/2, 53, 395, 426, 540

[56] References Cited

U.S. PATENT DOCUMENTS

| | | |
|---|---|---|
| 3,794,173 | 2/1974 | Bray . |
| 3,821,108 | 6/1974 | Manjikian . |
| 3,989,626 | 11/1976 | Bentley et al. . |
| 4,021,343 | 5/1977 | Tyler . |
| 4,160,727 | 7/1979 | Harris, Jr. . |
| 4,176,063 | 11/1979 | Tyler . |
| 4,230,579 | 10/1980 | Bray et al. . |
| 4,391,712 | 7/1983 | Tyler et al. . |
| 4,482,456 | 11/1984 | Grayson . |
| 4,585,554 | 4/1986 | Burrows . |
| 4,604,194 | 8/1986 | Entingh . |
| 4,695,375 | 9/1987 | Tyler . |
| 4,778,532 | 10/1988 | McConnell et al. . |
| 4,808,302 | 2/1989 | Beall, Jr. .................. 210/117 |
| 4,853,117 | 8/1989 | Burrows .................. 210/257.2 |
| 4,876,002 | 10/1989 | Marshall et al. .................. 210/136 |
| 4,885,085 | 12/1989 | Beall, Jr. . |
| 4,909,934 | 3/1990 | Brown et al. .................. 210/134 |
| 4,997,553 | 3/1991 | Clack .................. 210/257.2 |
| 5,167,837 | 12/1992 | Snodgrass et al. .................. 210/134 |

*Primary Examiner*—Ana Fortuna
*Attorney, Agent, or Firm*—Blakely, Sokoloff, Taylor & Zafman LLP

[57] ABSTRACT

A valve assembly for a reverse osmosis water purifier system that contains all of the control and check valves required for the system. The valve assembly is operative to provide squeeze water pressure to a pure water storage tank for providing delivery pressure to the pure water, for venting squeeze water to drain during purification, for turning on the tap water line during purification and dispensing and to shut off the tap water at all other times, to provide a flow of bleed or waste water through the reverse osmosis unit during purification and not at other times, including but not being limited to during dispensing, to provide a check valve in the pure water line to the dispensing head to maintain pressure in that line during purification when the pure water pressure in the accumulator tank is very low, and to provide a check valve between the pure water outlet of the reverse osmosis unit and the pure water connection to the pure water accumulator tank to prevent back pressuring the reverse osmosis unit membrane.

28 Claims, 3 Drawing Sheets

VALVE ASSEMBLY OF A REVERSE OSMOSIS WATER PURIFICATION SYSTEM

BACKGROUND OF THE INVENTION (1) Field of the Invention

The present invention relates to the field of water purifiers, and more specifically to improved compound valves for controlling the operation of reverse osmosis water purifying systems.

(2) Prior Art

U.S. Pat. No. 4,176,063 discloses a control valve for a reverse osmosis water purifying system. The valve controls the operation of the system according to the water pressure present in the system's pure water delivery line. The control valve comprises four individual diaphragm valves linked together by hydraulic passages. Two of the valves are in essence double diaphragm valves utilizing diaphragms of substantially different size with a mechanical linkage therebetween so that the desired hydraulic pressure ratios can be achieved.

One of the diaphragm valves is a check valve that maintains pressure in the pure water delivery line between the check valve and the dispensing spigot. The control valve also contains a double diaphragm pilot valve hydraulically linked to the pure water delivery line such that the pilot valve opens when the spigot is opened and the pure water pressure is low. The purifying system typically contains a pure water tank that contains a bladder which pressurizes the pure water therein. The bladder is pressurize by a squeeze water provided by an outlet of the reverse osmosis unit. The control valve has a third squeeze water diaphragm valve which opens in response to the opening of the pilot valve and controls the flow of pressurized waste water from the reverse osmosis unit to the pure water tank. Finally, the control valve contains a fourth diaphragm inlet valve which controls the inflow of water from the main water line to the system. This inlet valve is closed when the pure water tank is completely filled with pure water, to prevent water from flowing through the reverse osmosis unit when the tank no longer requires pure water.

This prior art control valve has subsequently been improved by the addition of two additional valves. The first of these, a duck bill valve, assures that there is always a limited flow of waste water through the reverse osmosis unit to remove salts and other impurities from the unit's filter membrane whenever water is being filtered, a function provided by a separate constriction elsewhere in the system in accordance with the disclosure of the '063 patent. The second additional valve, a diverter valve, allows squeeze water in the pure water tank to flow to a drain to eliminate the back pressure in the pure water during the filtering process.

U.S. Pat. No. 4,885,085 discloses another reverse osmosis water purifier control valve. The purifier valve has a single tap water inlet diaphragm valve that shuts off the inlet tap water when the pure water pressure approaches the tap water line pressure, indicating that the pure water storage tank is full. The '085 control valve also has a direct acting pilot valve that is responsive to the pure water pressure and used to control a squeeze water control valve. Functioning of the valve is very similar to that of the prior art though with a much simplified and more reliable structure.

In all of the foregoing systems, a check valve is required in the line between the pure water outlet of the reverse osmosis unit and the connection to the pure water side of the

2 pure water accumulator tank. For this purpose, a duck bill check valve has been used. These valves are simple in-line valves, but do not have the life and reliability of other parts of the system. A system with a separate check valve is more difficult to service because of uncertainty as to which specific valve may be causing a particular problem. It is therefore more difficult to determine which components should be serviced.

Also in the foregoing systems, the waste water output from the reverse osmosis element is routed directly to the drain line. Therefore the waste water flows during dispensing as well as during purification. This is both wasteful of water and of delivery pressure when dispensing.

BRIEF SUMMARY OF THE INVENTION

The present invention is valve assembly for a reverse osmosis water purifier system containing all of the control and check valves required for the system. The valve assembly is operative to provide squeeze water pressure to a pure water storage tank for providing delivery pressure to the pure water, for venting squeeze water to drain during purification, for turning on the tap water line during purification and dispensing and to shut off the tap water at all other times, to provide a flow of bleed or waste water through the reverse osmosis unit during purification and not at other times, including but not being limited to during dispensing, to provide a check valve in the pure water line to the dispensing head to maintain pressure in that line during purification when the pure water pressure in the accumulator tank is very low, and to provide a check valve between the pure water outlet of the reverse osmosis unit and the pure water connection to the pure water accumulator tank to prevent back pressuring the reverse osmosis unit membrane.

DETAILED DESCRIPTION OF THE INVENTION

Figure 1:
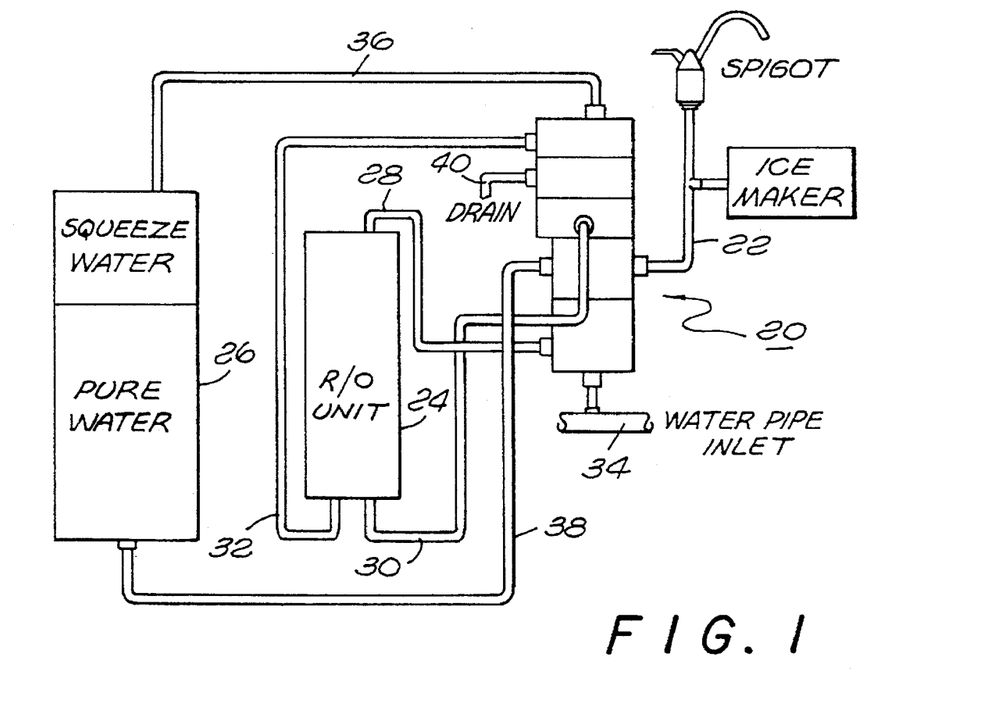
FIG. 1 is a schematic of a reverse osmosis water purification system of the present invention.

First referring to FIG. 1, the present invention valve assembly, generally indicated by the number 20, as connected as part of a reverse osmosis (RO) water purification system may be seen. In addition to an exemplary dispensing spigot and icemaker both connected to the single pure water outlet line 22, the RO system includes a reverse osmosis (R/O) unit 24 and a pure water accumulator tank, generally indicated by the numeral 26. The reverse osmosis unit as well as the pure water accumulator tank may be identical or substantially identical to that used in the prior art, and accordingly need not be described in any great detail herein.

The R/O unit 24 has three connections, a raw water or tap water inlet line 28, a pure water outlet line 30 and a bleed or waste water line 32. The tap water input provides a source of water to the raw water side of a reverse osmosis membrane located within a reverse osmosis unit. The pure water outlet line receives the pure water from the opposite outlet side of the reverse osmosis membrane. To prevent closing of the membrane, a flow of waste water is established along the raw water side of the RO membrane. The waste water flow rate during purification is typically some multiple of the purification rate, such as by way of example, six to eight times the purification rate, so that the impurity concentration in the raw water adjacent the membrane is not allowed to rise much above the impurity concentration in the raw water inlet line 28.

In older reverse osmosis water purifiers waste water flowed at all times, though because of the shortage of water experienced in some parts of the country in recent years, raw water shut-off valves have been provided as described above to shut off all raw water flow when the water purification system is in the quiescent state, namely when the pure water accumulator tank 26 is filled with pure water and no pure water is being dispensed from the system. Even with a shut off valve, waste water still flows, during dispensing of prior art systems, resulting in some remaining unnecessary waste of water. The flow of water during the dispensing process somewhat reduces the pure water delivery rate and pressure because of the total increased raw water flow that is required during dispensing to provide both squeeze water to the pure water accumulator and waste water to the R/O unit. In the present invention, however, as shall subsequently be seen in greater detail, the waste water flow is enabled during purification, but shut off both during the quiescent state of the system and during dispensing, thereby eliminating an increment of water waste and at the same time, eliminating the reduced pressure and reduced delivery rate of the pure water during pure water dispensing.

In the quiescent state, high pressure is maintained in the pure water outlet line 22 by a check valve in the valve assembly 20. This high pressure shuts off another valve in the valve assembly coupled to the raw water inlet line 34. When the dispensing spigot or icemaker valve is opened, the pressure in line 22 will drop. The drop in line pressure opens a valve connected to the raw water inlet line 34 so that high pressure raw water is provided to the reverse osmosis unit through line 28. The high pressure raw water flows through the waste water line 32 through another open valve in the valve assembly 20 to provide high pressure waste water to the squeeze water line 36. The squeeze water is provided to a bladder which pressures the pure water in the pure water accumulator tank 26. The pressurized bladder forces pure water through line 38, through the now open check valve in the valve assembly 20 and through the dispensing line 22.

When dispensing ceases, the pressure in lines 38 and 22 increases. Before the valve in the valve assembly 20 between the raw water inlet line 34 and the raw water line 28 closes, a diverter valve within the valve assembly 20 opens to vent the squeeze water line 36 to a drain line 40. This relieves the pure water pressure in the pure water accumulator tank 26 and thus the pressure in line 38 to the valve assembly 20. The lower pure water pressure maintains in an open position the valve between the raw water inlet line 34 and the raw water line to the R/O unit 28. It also opens a valve which couples the waste water line 32 to drain 40 through a flow restrictor in the valve assembly 20. The flow restrictor allows purification to proceed with high pressure on the raw water side of the R/O unit membrane and low pressure on the pure water side of the R/O unit membrane, with a controlled waste water flow through waste water line 32, valve assembly 20 and drain line 40. Finally, when pure water accumulator tank 26 becomes filled with pure water, pure water pressure in the tank line 38 and line 22 will increase, shutting off the valve between the valve assembly 20 between line 34 and line 28 to shut off all further water flow in the system.

During purification, a substantial pressure is held in line 22 in spite of the low pressure in line 38 by a check valve in the valve assembly 20. The line pressure is adequate to hold the valve open in the valve assembly 20 which vents the squeeze water line 36 to drain, and to couple the waste water line 32 to drain through a flow restriction in the valve assembly 20. Now the dropping of pressure in line 22 due to the opening of the spigot or the icemaker valve during purification will set the various valves in the valve assembly 20 in the state hereinbefore described with respect to the dispensing mode. Thus dispensing may be initiated in the same manner, whether during purification or after purification is complete and the system is in its quiescent state.

Note that in the water purification system shown in FIG. 1, all valves in the system are within valve assembly 20. For servicing purposes, all valves in the system may be changed by merely swapping out valve assemblies. Further, within the water purification system itself, there are no "Tee" connections in the interconnection of valve assembly 20, R/O unit 24 and squeeze water accumulator tank 26. Also, the interconnection of the various elements of the reverse osmosis water purification system is simplified in that there is no opportunity to reverse a check valve in the pure water line between the reverse osmosis unit and the pure water accumulator tank a characteristic of prior art systems, as the check valve is now incorporated into the valve assembly 20.

Figure 2:
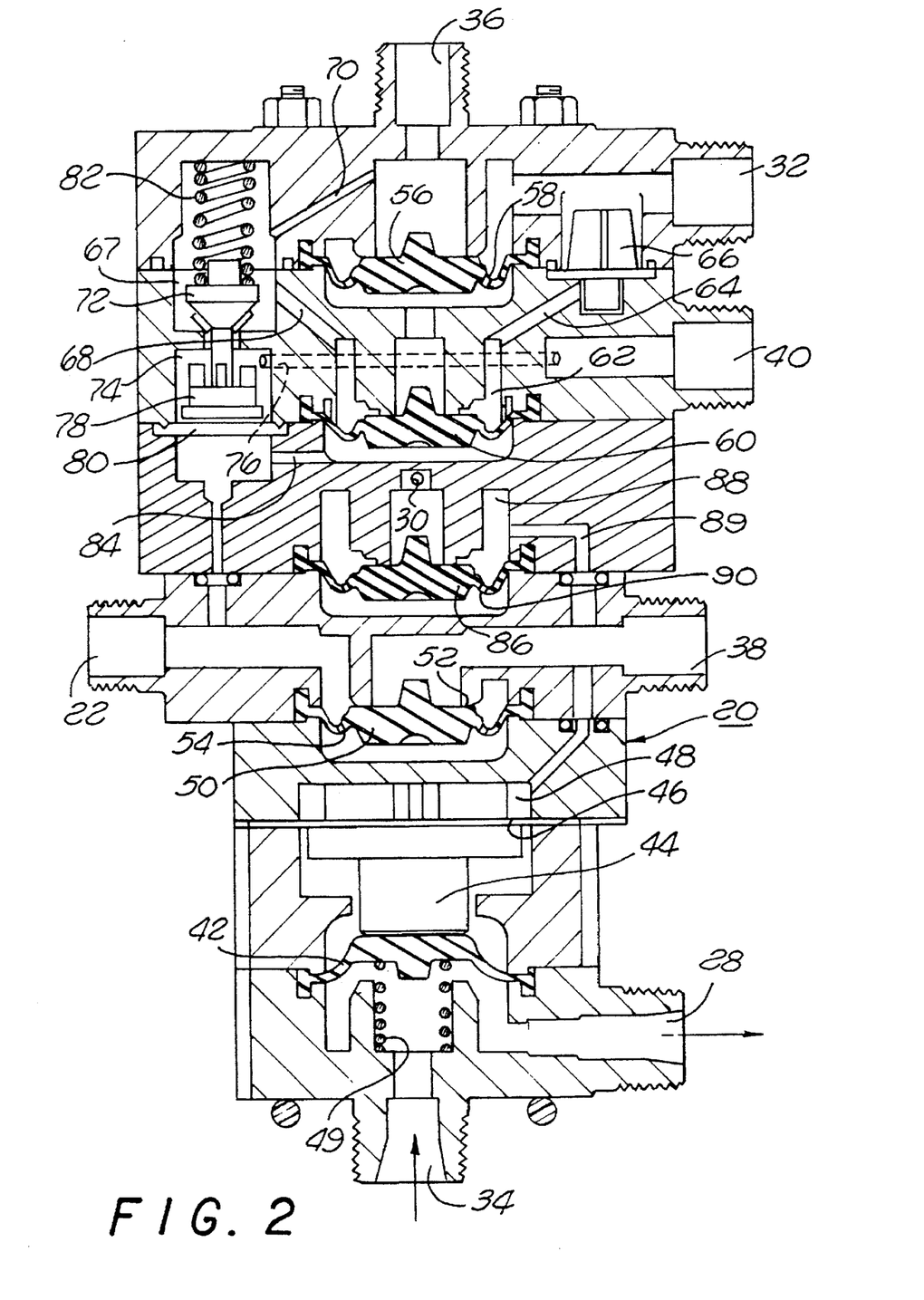
FIG. 2 is a cross-sectional view showing a valve assembly of the system.

Now referring to FIG. 2, a cross-section of the valve assembly 20 of FIG. 1 may be seen. In this valve assembly, a diaphragm valve 42 couples the raw water inlet 34 to raw water outlet 28. The diaphragm valve 42 is normally being open during purification and pure water dispensing. The diaphragm 42 is connected to a piston 44 that is mounted to another diaphragm 46. The diaphragm 46 is in fluid communication with a chamber 48 that is connected to the pure water line 38. The piston 44 has an area ratio that multiplies the pure water pressure applied to the diaphragm 42. When the pure water pressure in line 38 approaches an upper limit, the pressure moves the piston 44 and forces the diaphragm valve 42 closed to shut off the raw water supply. When dispensing, the pressure of the pure water in the accumulator 26 is sufficiently below the raw water line pressure so that the diaphragm valve 42 will be open adequately to provide squeeze water to the accumulator for pure water delivery purposes. Also, during purification, when squeeze water is vented to drain, the pure water pressure in line 38 will be quite low, so that the diaphragm valve 42 will be open during purification. However, as the pure water accumulator 26 is filled with pure water, the pure water pressure will rise, ultimately approaching the raw water line pressure, whereby diaphragm valve 42 will close to prevent the further flow of waste water when no further purification is occurring.

The pure water from the accumulator 26 in line 38 is coupled through a valve port 50 to pure water outlet line 22, the valve port 50 having a Dole diaphragm 52 disposed in a cooperative position with respect thereto. The Dole diaphragm 52 has openings 54 which allow water to flow from the region behind the Dole diaphragm so that the diaphragm can move to an open position. An open diaphragm 52 allows water flow from the pure water outlet of the accumulator through line 38 to the dispensing line 22 during dispensing, and of course, to allow the pressure in line 22 to increase in response to increases in pressure in line 38 when not dispensing. The elasticity of the Dole diaphragm 52, however, encourages the same toward a closed condition so that whenever the pressure in line 38 decreases with respect to the pressure in line 22, the Dole valve 52 will be firmly forced to a closed position to retain the pressure in line 22 in spite of the drop of pressure in line 38 due to the drop in pressure of the pure water in the accumulator.

The valve assembly 20 has a second Dole diaphragm 56 that controls the flow of water from the waste water line 32 to the squeeze water line 36. The Dole diaphragm 56 has a pair of openings 58 that allow water to flow into the top face of diaphragm 60 located in chamber 62. Fluid communication between the chamber and the waste water line 32 is also provided by passage 64. The flow of water through the passage is controlled by a flow restrictor 66. The flow restrictor 66 is preferably a duck bill that maintains a relatively small center leakage path even when the restrictor is closed. The restrictor 66 is closed when there is a differential pressure between the waste water line 32 and the chamber 62. When the pressures are equal the duck bill opens to provide a self-cleaning action on the flow restrictor 66.

The chamber 62 and squeeze water line 36 are in fluid communication with a first diverter valve chamber 67 through passages 68 and 70, respectively. Within the first diverter valve chamber 67 is a diverter valve 72 that controls the flow of water between the first diverter valve chamber 67 and a second diverter valve chamber 74. The second valve chamber 74 is in fluid communication with the drain line 40 through drain passage 76. The diverter valve 72 has a piston 78 that cooperates with a diaphragm 80 to move the valve 72 into an open position. The diaphragm 80 is in fluid communication with the water line 22 so that the valve 72 position is a function of the line 22 pressure. When the diverter valve 72 is open, water can flow from the waste 32 and squeeze 36 lines to the drain line 40 via the passages 68 and 70. The diverter valve 72 is biased into a closed position by a spring 82.

A pressure sensing line 84 provides fluid communication between the chamber 62 and the tap water line 22. When water is dispensed, there is a corresponding drop in the water pressure of line 22. The drop in line 22 pressure opens the Dole diaphragm 52 so that there is a corresponding drop in the pressure of line 38. The lower line 38 pressure allows the spring to unseat the diaphragm 42 so that raw water flows into the reverse osmosis unit 24. The flow of raw water also creates waste water from the membrane. The waste water increases the pressure on the top surface of diaphragm 56.

The drop of line 22 pressure causes the diaphragm 80 to deflect so that the diverter valve 72 moves to the closed position. The drop in line 22 pressure reduces the pressure applied to the bottom face of diaphragm 60. The differential pressure created by the waste water on one side of the diaphragm 60 and the lower pure water pressure on the opposite side of the diaphragm 60 open the diaphragm valve 60. Because of the flow restrictor 66 the pressure on the bottom face of the diaphragm 56 has a lower pressure than the pressure of the waste line 32. The differential pressure opens the diaphragm 56 to establish fluid communication between the waste line 32 and the squeeze line 36. The flow of waste water into the squeeze line 36 of the accumulator assists in maintaining the pressure of the pure water being dispensed from the tap. This is to be distinguished from prior art systems which vent a portion of the waste water to drain, thereby creating an inefficient usage of water and waste water energy. The flow of waste water is relatively minimal so that no purification of water occurs during the dispensing of pure water.

When dispensing is terminated, the pressure in line 22 increases to open the diverter valve 72. The open diverter valve 72 allows the waste water line 32 to vent to drain 40 through passage 76, so that the raw water can be purified by the reverse osmosis membrane. The purification process continues until the pressure in line 38 closes the diaphragm valve 42.

The valve assembly 20 includes a Dole diaphragm check valve 86 located between the pure water line 38 and the pure water output line 30 of the reverse osmosis unit 24. The valve 86 is located within a chamber 88 that is connected to the pure water pure water output 30 by conduit 89. The valve 86 opens when the pressure on the output of the reverse osmosis membrane is greater than the pressure within the accumulator inlet line 38. The valve closes when the output pressure from the RO membrane drops below the tank pressure. The check valve 86 insures that there is not a back flush of the reverse osmosis membrane from the accumulator tank. The diaphragm valve 86 contains a pair of apertures 90 that allow water to flow from the bottom side of the diaphragm to allow the valve to open.

Figure 3:
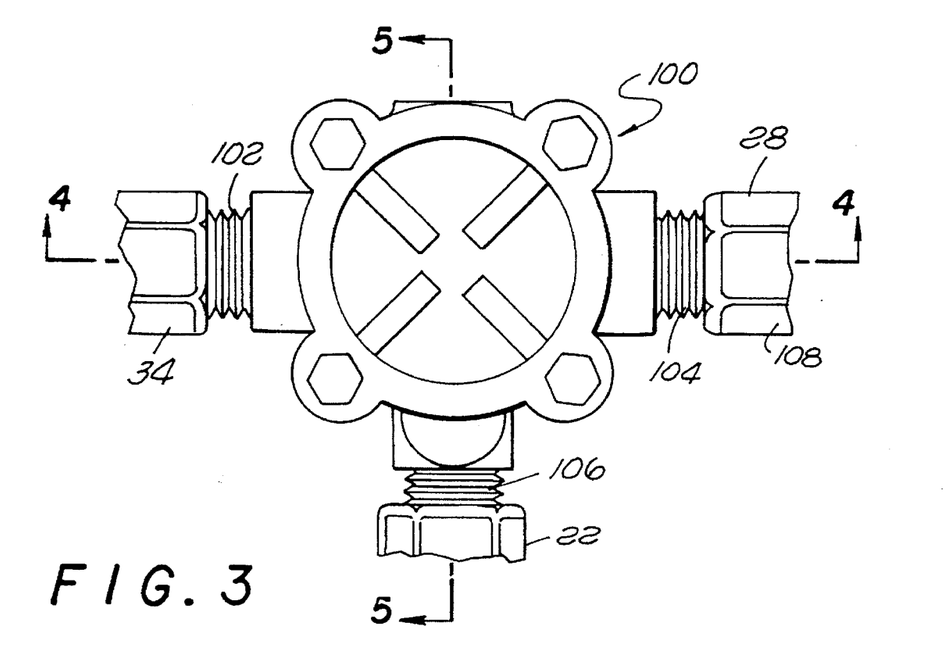
FIG. 3 is a top view of a separate raw water control valve.
Figure 4:
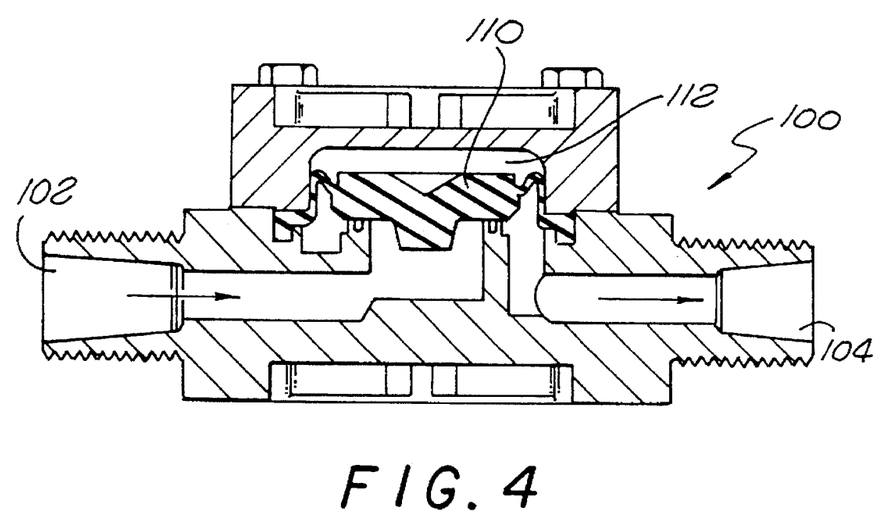
FIG. 4 is a cross-sectional view taken at line 4—4 of FIG. 3.
Figure 5:
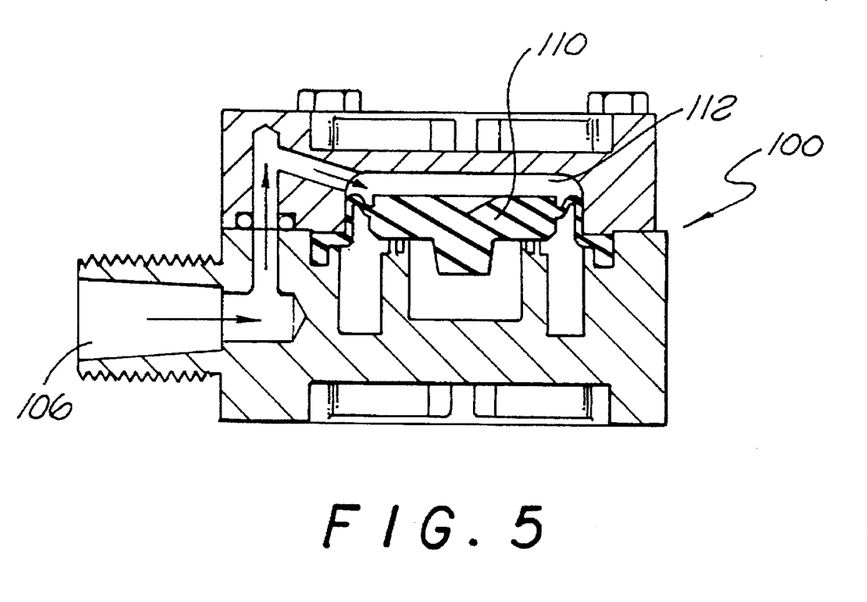
FIG. 5 is a cross-sectional view taken at line 5—5 of FIG. 3.

Although a raw water valve is shown as being integral with the valve assembly, as shown in FIGS. 3–5, the reverse osmosis system may have a separate raw water valve 100. The valve has a first port 102 connected the raw water line 34, a second port 104 connected to the input line 28 of the reverse osmosis membrane, and a third port 106 connected to the output line 22 of the accumulator. The valve 100 is preferably constructed from a molded plastic housing 108 which has pipe threads that allow the device to be readily attached to any reverse osmosis system. The housing 106 may be connected to the various lines with standard pipe fittings 108.

Within the valve is a diaphragm 110 that controls the flow of water between the first 102 and second 104 ports. Located above the diaphragm 110 is a chamber 112 that is in fluid communication with the third port 106. When the pure water pressure falls below the raw water pressure, the differential pressure across the diaphragm 110 moves the diaphragm valve 110 to the open position to create fluid communication between the first 102 and second 104 ports. A subsequent increase in the pure water pressure within the chamber 112 will push the diaphragm back to the closed position. The resiliency of the diaphragm tends to bias the valve into the closed position. Although not shown the valve assembly may include a spring located within the chamber 112 to bias the diaphragm into the closed position.

I claim:

1. A valve assembly for a reverse osmosis water purification system that is coupled to a raw water line, a tap line and a drain line, the reverse osmosis water purification system includes a reverse osmosis membrane unit which has a raw water inlet port, a waste water outlet port and a pure water outlet port, the membrane is coupled to an accumulator which has a single pure water inlet/outlet port and a squeeze water inlet port, comprising:

a housing that has a first pure water inlet port coupled to the pure water outlet port of the accumulator, a pure water outlet port coupled to the tap line, a drain outlet port coupled to the drain line, a waste water inlet port coupled to the waste water outlet port of the reverse osmosis membrane and a squeeze water outlet port coupled to the squeeze water inlet port of the accumulator;

a pure water check valve that moves between an open position and a closed position to control a flow of water from said first pure water inlet port to said pure water outlet port of said housing;

a squeeze water valve that moves between an open position and a closed position to control a flow of water from said waste water inlet port to said squeeze water outlet port of said housing;

a squeeze water pilot valve that is coupled to said waste water inlet port and said pure water outlet port, said squeeze water pilot valve moves from a closed position to an open position when a pure water outlet port pressure falls below a predetermined level, wherein said squeeze water valve moves to the open position in response to said squeeze water pilot valve moving to the open position;

a flow restrictor that regulates a flow of water between said waste water inlet port and said squeeze water pilot valve; and, a diverter valve that is coupled to said pure water outlet port, said drain port and said second squeeze valve, said diverter valve moves between an open position and a closed position, wherein said diverter valve moves to said open position when a pure water outlet port pressure exceeds a predetermined level, movement of said diverter valve to the open position allows water to flow from said waste water inlet port through said squeeze water valve and, said diverter valve moves to the closed position and prevents fluid communication between said waste water inlet port and said drain outlet port when the pure water outlet port exceeds the predetermined level said squeeze water pilot valve to said drain outlet port.

2. The assembly as recited in claim 1, further comprising a raw water check valve that moves between an open position and closed position to control the flow of water from a raw water inlet port of said housing that is coupled to the raw water line and a raw water outlet port, of said housing that is coupled to the raw water inlet port of the reverse osmosis membrane, said raw water check valve being coupled to said first pure water inlet port so that said raw water check valve moves to the open position when a pure water inlet port pressure falls below a predetermined level.

3. The assembly as recited in claim 2, further comprising a spring that biases said raw water check valve into the open position.

4. The assembly as recited in claim 2, further comprising a piston which has a first face attached to said diaphragm and a second face coupled to said pure water inlet port, said second face being larger than said first face.

5. The assembly as recited in claim 1, further comprising a check valve housing which has a raw water inlet port coupled to the raw water line, a raw water outlet port coupled to the raw water inlet port of the reverse osmosis membrane and a pure water inlet port coupled to the pure water outlet port of the accumulator, said housing containing a raw water check valve that moves between an open position and a closed position to control the flow of water between said raw water inlet port and said raw water outlet port.

6. The assembly as recited in claim 1, further comprising a second pure water check valve that moves between an open position and a closed position to control the flow of water from a second pure water inlet port and said first pure water inlet port.

7. The assembly as recited in claim 1, further comprising a spring that biases said diverter valve into the closed position.

8. A reverse osmosis water purification system that is coupled to a raw water line, a tap line and a drain line, comprising:

a reverse osmosis membrane unit which has a raw water inlet port, a waste water outlet port and a pure water outlet port;

an accumulator which has a single pure water inlet/outlet and a squeeze water inlet port;

a housing that has a first pure water inlet port coupled to the pure water outlet port of the accumulator, a pure water outlet port coupled to the tap line, a drain outlet port coupled to the drain line, a waste water inlet port coupled to the waste water outlet port of the reverse osmosis membrane and a squeeze water outlet port coupled to the squeeze water inlet port of the accumulator;

a pure water check valve that moves between an open position and a closed position to control a flow of water from said first pure water inlet port to said pure water outlet port of said housing;

a squeeze water valve that moves between an open position and a closed position to control a flow of water from said waste water inlet port to said squeeze water outlet port of said housing;

a squeeze water valve pilot that is coupled to said waste water inlet port and said pure water outlet port, said squeeze water pilot valve moves from a closed position to an open position when a pure water outlet port pressure falls below a predetermined level, wherein said squeeze water valve moves to the open position in response to said squeeze water pilot valve moving to the open position;

a flow restrictor that regulates a flow of water between said waste water inlet port and said squeeze water pilot valve; and, a diverter valve that is coupled to said pure water outlet port, said drain port and said second squeeze valve, said diverter valve moves between an open position and a closed position, wherein said diverter valve moves to said open position when a pure water outlet port pressure exceeds a predetermined level, movement of said diverter valve to the open position allows water to flow from said waste water inlet port through said squeeze water valve and, said diverter valve moves to the closed position and prevents fluid communication between said waste water inlet port and said drain outlet port went he pure water outlet port exceeds the predetermined level said squeeze water pilot valve to said drain outlet port.

9. The system as recited in claim 8, further comprising a raw water check valve that moves between an open position and closed position to control the flow of water from a raw water inlet port of said housing that is coupled to the raw water line and a raw water outlet port, of said housing that is coupled to said raw water inlet port of the reverse osmosis membrane, said raw water check valve being coupled to said first pure water inlet port so that said raw water check valve moves to the open position when a pure water inlet port pressure falls below a predetermined level.

10. The system as recited in claim 9, further comprising a spring that biases said raw water check valve into the open position.

11. The system as recited in claim 9, further comprising a piston which has a first face attached to said diaphragm and a second face coupled to said pure water inlet port, said second face being larger than said first face.

12. The system as recited in claim 8, further comprising a check valve housing which has a raw water inlet port coupled to the raw water line, a raw water outlet port coupled to said raw water inlet port of the reverse osmosis membrane and a pure water inlet port coupled to said pure water outlet port of the accumulator, said housing containing a raw water check valve that moves between an open position and a closed position to control the flow of water between said raw water inlet port and said raw water outlet port.

13. The system as recited in claim 8, further comprising a second pure water check valve that moves between an open position and a closed position to control the flow of water from a second pure water inlet port and said first pure water inlet port.

14. The system as recited in claim 8, further comprising a spring that biases said diverter valve into the closed position.

15. A valve assembly for a reverse osmosis water purification system that is coupled to a raw water line, a tap line and a drain line, the reverse osmosis water purification system includes a reverse osmosis membrane unit which has a raw water inlet port, a waste water outlet port and a pure water outlet port, the membrane is coupled to an accumulator which has a single pure water inlet/outlet port and a squeeze water inlet port, comprising:

a housing that has a first pure water inlet port coupled to the pure water outlet port of the accumulator, a second pure water inlet port coupled to the pure water outlet port of the reverse osmosis membrane, a pure water outlet port coupled to the tap line, a drain outlet port coupled to the drain line, a waste water inlet port coupled to the waste water outlet port of the reverse osmosis membrane and a squeeze water outlet port coupled to the squeeze water inlet port of the accumulator;

a first pure water check valve that moves between an open position and a closed position to control a flow of water from said first pure water inlet port to said pure water outlet port of said housing;

a squeeze water valve that moves between an open position and a closed position to control a flow of water from said waste water inlet port to said squeeze water outlet port of said housing;

a squeeze water pilot valve that is coupled to said pure water outlet port and said drain outlet port, said squeeze water pilot valve moves from a closed position to an open position when a pure water outlet port pressure falls below a predetermined level wherein said squeeze water valve moves to the open position in response to said squeeze water pilot valve moving to the open position;

a second pure water check valve that moves between an open position and a closed position to control a flow of water from said second pure water inlet port to said pure water outlet port of said housing; and, a diverter valve that is coupled to said pure water outlet port, said drain port and said second squeeze valve, said diverter valve moves between an open position and a closed position, wherein said diverter valve moves to said open position when a pure water outlet port pressure exceeds a predetermined level, movement of said diverter valve to the open position allows water to flow from said waste water inlet port through said squeeze water valve and, said diverter valve moves to the closed position and prevents fluid communication between said waste water inlet port and said drain outlet port when the pure water outlet port exceeds the predetermined level squeeze water pilot valve to said drain outlet port.

16. The assembly as recited in claim 15, further comprising a raw water check valve that moves between an open position and closed position to control the flow of water from a raw water inlet port of said housing that is coupled to the raw water line and a raw water outlet port of said housing that is coupled to the raw water inlet port of the reverse osmosis membrane, said raw water check valve being coupled to said first pure water inlet port so that said raw water check valve moves to the open position when a pure water inlet port pressure falls below a predetermined level.

17. The assembly as recited in claim 16, further comprising a spring that biases said raw water check valve into the open position.

18. The assembly as recited in claim 16, further comprising a piston which has a first face attached to said diaphragm and a second face coupled to said pure water inlet port, said second face being larger than said first face.

19. The assembly as recited in claim 15, further comprising a check valve housing which has a raw water inlet port coupled to the raw water line, a raw water outlet port coupled to the raw water inlet port of the reverse osmosis membrane and a pure water inlet port coupled to the pure water outlet port of the accumulator, said housing containing a raw water check valve that moves between an open position and a closed position to control the flow of water between said raw water inlet port and said raw water outlet port.

20. The assembly as recited in claim 15, further comprising a flow restrictor that regulates a flow of water between said waste water inlet port and said second squeeze valve.

21. The assembly as recited in claim 15, further comprising a spring that biases said diverter valve into the closed position.

22. The system as recited in claim 15, further comprising a second pure water check valve that moves between an open position and a closed position to control the flow of water from a second pure water inlet port and said first pure water inlet port.

23. The system as recited in claim 15, further comprising a spring that biases said diverter valve into the closed position.

24. A reverse osmosis water purification system that is coupled to a raw water line, a tap line and a drain line, comprising:

a reverse osmosis membrane which has a raw water inlet port, a waste water outlet port and a pure water outlet port;

an accumulator which has a single pure water inlet/outlet port and a squeeze water inlet port;

a housing that has a first pure water inlet port coupled to the pure water outlet port of the accumulator, a second pure water inlet port coupled to the pure water outlet port of the reverse osmosis membrane, a pure water outlet port coupled to the tap line, a drain outlet port coupled to the drain line, a waste water inlet port coupled to the waste water outlet port of the reverse osmosis membrane and a squeeze water outlet port coupled to the squeeze water inlet port of the accumulator;

a first pure water check valve that moves between an open position and a closed position to control a flow of water from said first pure water inlet port to said pure water outlet port of said housing;

a squeeze water valve that moves between an open position and a closed position to control a flow of water from said waste water inlet port to said squeeze water outlet port of said housing;

a squeeze water pilot valve that is coupled to said pure water outlet port and said drain outlet port said squeeze water pilot valve moves from a closed position to an open position when a pure water outlet port pressure falls below a predetermined level wherein said squeeze water valve moves to the open position in response to said squeeze water pilot valve moving to the open position;

a second pure water check valve that moves between an open position and a closed position to control a flow of water from said second pure water inlet port to said pure water outlet port of said housing; and, a diverter valve that is coupled to said pure water outlet port, said drain port and said second squeeze valve, said diverter valve moves between an open position and a closed position, wherein said diverter valve moves to said open position when a pure water outlet port pressure exceeds a predetermined level, movement of said diverter valve to the open position allows water to flow from said waste water inlet port through said squeeze water valve and, said diverter valve moves to the closed position and fluid communication between said waste water inlet port and said drain outlet port when the pure water outlet port exceeds the predetermined level said squeeze water pilot valve to said drain outlet port.

25. The system as recited in claim 24, further comprising a raw water check valve that moves between an open position and closed position to control the flow of water from a raw water of said housing inlet port that is coupled to the raw water line and a raw water of said housing outlet port that is coupled to said raw water inlet port of the reverse osmosis membrane, said raw water check valve being coupled to said first pure water inlet port so that said raw water check valve moves to the open position when a pure water inlet port pressure falls below a predetermined level.

26. The system as recited in claim 25, further comprising a spring that biases said raw water check valve into the open position.

27. The system as recited in claim 25, further comprising a piston which has a first face attached to said diaphragm and a second face coupled to said pure water inlet port, said second face being larger than said first face.

28. The system as recited in claim 24, further comprising a check valve housing which has a raw water inlet port coupled to the raw water line, a raw water outlet port coupled to said raw water inlet port of the reverse osmosis membrane and a pure water inlet port coupled to said pure water outlet port of the accumulator, said housing containing a raw water check valve that moves between an open position and a closed position to control the flow of water between said raw water inlet port and said raw water outlet port.

* * * * *

UNITED STATES PATENT AND TRADEMARK OFFICE
CERTIFICATE OF CORRECTION

PATENT NO. : 5,662,793 Page 1 of 1
DATED : September 2, 1997
INVENTOR(S) : Richard W. Beall, Jr.

It is certified that error appears in the above-identified patent and that said Letters Patent is hereby corrected as shown below:

<u>Column 8,</u>
Line 1, after "inlet/outlet" insert -- port --.

Signed and Sealed this

Eighth Day of April, 2003

JAMES E. ROGAN
*Director of the United States Patent and Trademark Office*